3,280,620
LEAK DETECTION IN VACUUM JACKETS
James H. Anderson, 1615 Hillock Lane, York, Pa.
Filed June 11, 1964, Ser. No. 374,429
9 Claims. (Cl. 73—40.5)

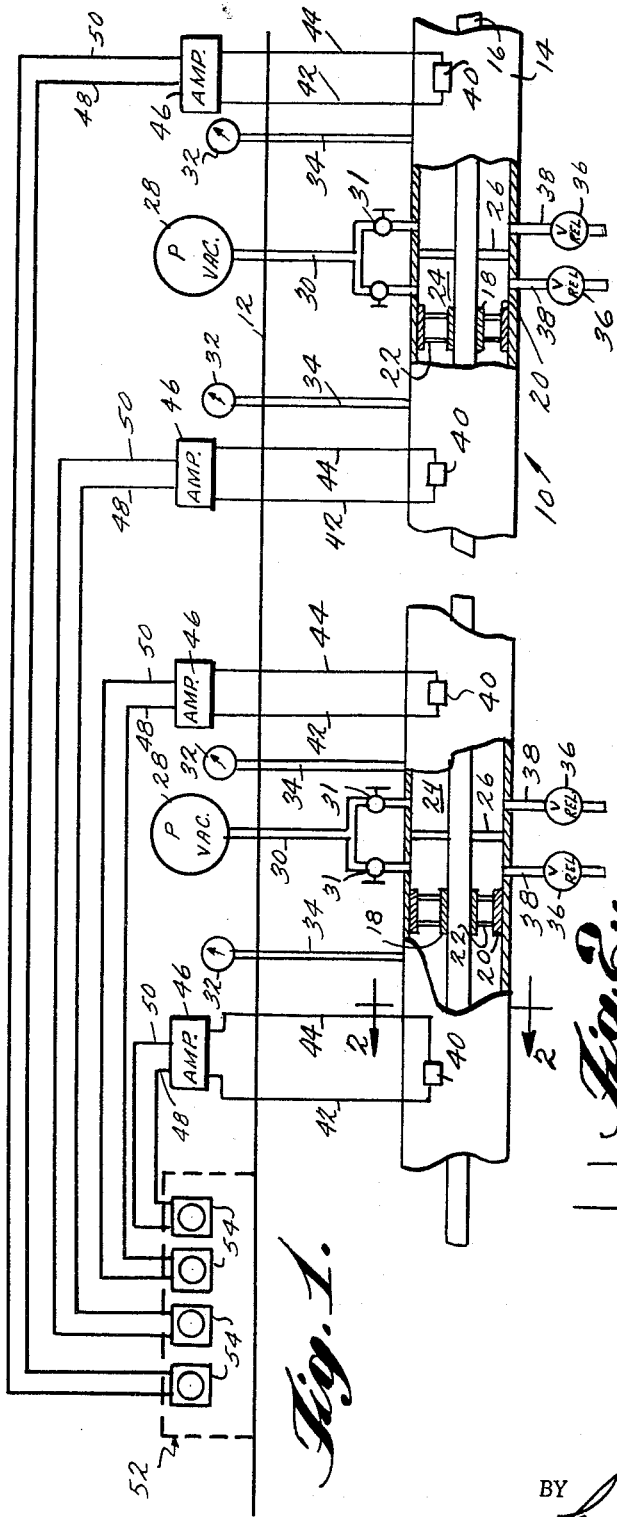
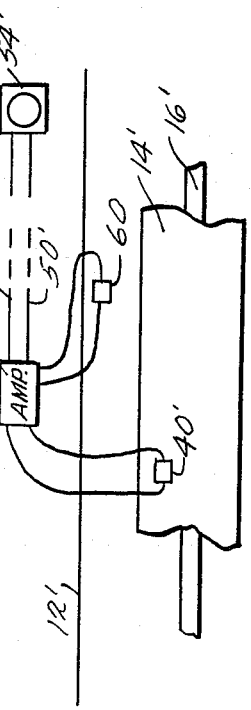
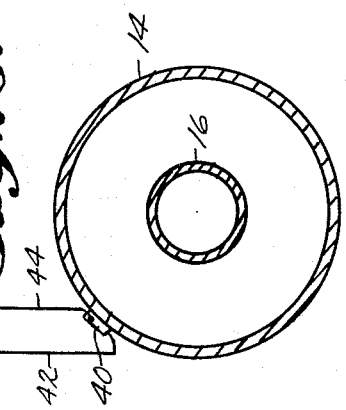
Oct. 25, 1966   J. H. ANDERSON   3,280,620
LEAK DETECTION IN VACUUM JACKETS
Filed June 11, 1964
INVENTOR
JAMES H. ANDERSON
BY Cushman, Darby & Cushman
ATTORNEYS

United States Patent Office 3,280,620
Patented Oct. 25, 1966

This invention relates to thermal insulating vacuum jackets and in particular to the detection of leakage of fluid material into the vacuum space of such jackets.

It is the primary object of the present invention to provide a method and apparatus for detecting the presence of a leak in an insulating vacuum jacket having spaced inner and outer walls, wherein an increase in the thermal conductivity of the vacuum space, caused by leakage of fluid into the space, is employed to indicate the presence of the leak.

It is a more specific object to provide a method and apparatus of the above type wherein a change in the temperature of the outer wall of the jacket, due to leakage of material into the vacuum space and consequent heat transfer between the inner and outer walls, is employed to detect the leak.

It is a further object to provide a method and apparatus of the above type having different fluids disposed on opposite sides of the inner and outer walls and wherein a change in the thermal conductivity of the vacuum space is employed to determine whether leakage has occurred through the inner wall or the outer wall.

It is a still further object to provide a vacuum jacketed pipe line for cold fluids in which a space between an inner wall and an outer wall is evacuated for insulating purposes and to provide a method and apparatus for determining the approximate location of a leak and for distinguishing between leakage of cold fluid into the space through the inner pipe and leakage of ambient air through the outer pipe.

The invention is described herein as applied to a long distance pipe line for cold, liquified methane, although the principles of the invention are applicable to vacuum jackets generally. In order to provide thermal insulation for the methane the pipe line is constructed of an inner pipe and a larger, concentric outer pipe which defines with the inner pipe an annular space. The space is evacuated with a vacuum pump thereby creating an insulating vacuum jacket around the methane-conducting inner pipe. In such an arrangement the wall of the outer pipe will be very effectively insulated from the inner pipe and will normally assume a temperature about equal to its surroundings. The wall of the inner pipe will assume the temperature of the pressurized liquid methane, for example −130° F. Accordingly, there will be a very large temperature drop across the vacuum space and a relatively small temperature differential between the wall of the outer pipe and the ground or the air, if the pipe is above ground.

If a leak occurs in either the outer or inner pipe the vacuum is lowered, or destroyed entirely, and the annular space becomes thermally conductive due to the presence of methane or air. The wall temperature of the outer pipe therefore drops due to the conductance of heat into the inner pipe and into the methane. According to the invention, this decrease in the wall temperature of the outer pipe is employed not only to indicate a leak, generally, but also to distinguish between an air leak through the wall of the outer pipe and a methane leak through the wall of the inner pipe.

Considering first an air leak, it will be apparent that total destruction of the vacuum insulation will tend to cool the wall of the outer pipe to a temperature not lower than the temperature of the inner pipe, in this case, assumed to be −130° F. If a vacuum pump has been connected to the annular space for maintaining a vacuum under normal conditions, a relatively small air leak will only partially destroy the insulating vacuum, and the temperature of the wall of the outer pipe will drop to some temperature above the temperature of the inner pipe. Accordingly, by continuously or intermittently measuring the temperature of the outer pipe wall an air leak will be detected as a drop in the outer wall temperature.

If a methane leak occurs in the wall of the inner pipe, a similar destruction of the insulating vacuum will occur. However, the resulting drop in the outer pipe wall temperature is likely to be considerably greater and faster than for an air leak for several reasons. The liquid methane in the inner pipe, being at a much lower temperature than the initial temperature of the outer pipe, will tend to cool the latter rapidly. In addition, the heat conductivity of methane gas is greater than that of air. Of greater effect is the cooling effect inherent in the evaporation of the methane as it leaks into the area of lesser pressure. Accordingly, a methane leak through the inner pipe wall may be identified by a sudden large drop in the temperature of the outer pipe wall and/or by a very low outer pipe wall temperature. In most cases it will be possible to distinguish a methane leak from an air leak by the rapidity and/or magnitude of the temperature drop. Very small leaks may not be distinguishable on this basis because the temperature drop may be relatively small and thereby indicate only that there is a loss in vacuum due to a leak of either methane or air.

The invention will be further understood from the following more detailed description taken in conjunction with the drawing in which:

FIGURE 1 is a schematic side elevational view of a vacuum jacketed pipe line for cold liquified gas;

FIGURE 2 is a sectional view taken on the line 2—2 of FIGURE 1; and

FIGURE 3 is a fragmentary view showing a modification of the manner of employing the wall temperature of the outer pipe.

Referring to FIGURE 1 there is shown, schematically, a section of a pipe line 10 extending horizontally below the level of the ground 12 for transferring cold pressurized liquid methane from one locality to another. The pipe line 10 is constructed of an outer pipe 14 and a smaller, methane-conducting pipe 16 suspended concentrically therein by suitable supports so as to define an annulus between the pipes. As shown, the supports are of the type described in detail in my copending application Vacuum Jacket Construction Serial No. 374,448, filed June 11, 1964. They include a plurality of axially spaced plastic rings 18 secured to the outer surface of the inner pipe 16 and a corresponding number of rings 20 engaging the inner surface of the outer pipe 14. Each pair of inner and outer rings 18, 20 are arranged concentrically and tensioned cables 22 of low heat conductive material, such as nylon, are interlaced between them to hold the inner ring 18 and the inner pipe 16 in place.

The annulus between the inner and outer pipes is divided into axial vacuum jacket sections 24 by means of a plurality of vertical plates 26 which are sealed to the opposed surfaces of the pipes 14 and 16. A vacuum pump 28 is located above ground near the junction of adjacent sections 24 of the annulus and suitable piping 30 is provided from the inlet of the pump 28 to the wall of the outer pipe 14 on opposite sides of the respective plates 26. As shown, the piping 30 includes a branch containing a valve 31 leading to each adjacent section 24 so that operation of a pump 28 can selectively evacuate either of two sections 24 to provide an insulating vacuum.

Each section 24 of the vacuum jacket is provided with a separate pressure gauge 32 located above ground and connected through the outer pipe 14 by means of suitable tubing 34. To prevent bursting of the outer pipe 14 in the event of a large methane leak through the wall of the inner pipe 16, a pressure relief valve 36 is also connected to each section 24 by means of a pipe 38.

In order to measure the outer wall temperature of each vacuum section 24, a temperature sensitive device, such as a thermocouple element 40 is attached in good thermal contact to the exterior of the outer pipe 14 at axially spaced locations. At least one thermocouple 40 should be associated with each jacket section 24, but more than one may be employed if desired, particularly if the sections 24 are long. The use of thermocouples 40 is a preferred arrangement, because accurate temperature measurements can be easily transmitted thereby. Other types of measuring devices such as resistance thermometers may be employed if desired, however.

In the illustrated arrangement, a pair of electrical lead wires 42, 44 extends from each thermocouple element 40 to an above-ground amplifier 46 which in turn is provided with output leads 48, 50 extending to a central station 52. At the latter, which may be at a location remote from the pipe line 10, each set of output leads 48, 50 is connected to a recording instrument 54, such as a recording potentiometer so that a record may be kept of the wall temperature of the outer pipe 14 in each jacket section 24. It will be apparent that the measuring and recording equipment and the circuits therefor are subject to many modifications and refinements depending on the desired accuracy of measurement, the length of the pipe line 10 and other variables.

In the operation of the FIGURE 1 system the temperatures of different parts of the outer pipe 14 are continually monitored by the thermocouples 40 whose electrical outputs are amplified and sent to the recorders 54. The electrical signals are converted by the latter to be recorded and, if desired, visual markings on a scale so that any drop in wall temperature will be immediately apparent to an operator at the control station 52. As heretofore explained, the evacuation of the jacket sections 24 by continuous or intermittent operation of the vacuum pumps 28, effectively insulates the cold inner pipe 16 from the outer pipe 14, and the latter assumes a temperature about equal to that of its surroundings.

If a hole or crack occurs in the wall of the outer pipe 14 caused, for example, by ground heaval, air will be drawn into the jacket section 24 in which the leak occurs and will partially or fully destroy the vacuum therein. The air will then conduct heat away from the wall of the outer pipe 14 with the result that the temperature of the latter will drop. If the temperature of the liquid methane in the inner pipe is $-130°$ F., the temperature of the outer pipe 14 will drop toward that value as a lower limit. The change in temperature of the outer pipe 14 from ground temperature, for example 60° F., to a much lower value will be immediately reflected in a corresponding movement of the indicating arm of the recorder 54 which receives its signals from the thermocouple 40. An operator, alerted by the new reading on the recorder 54, can then notify a repair crew or take any other necessary action. The jacket section 24 in which the leak has occurred will, of course, be known from the identity of the recorder 54 which has indicated a temperature change.

If a methane leak occurs through the wall of the inner pipe 16 into one of the jacket sections 24, a similar temperature drop will be observed on the respective recorder 54. As discussed above, however, this temperature drop in most instances, will be of greater rapidity and magnitude than a temperature drop caused by an air leak. This is due primarily to the greater heat conductivity of methane gas and to the absorption of heat by liquid methane as it vaporizes on the jacket section 24. A relatively large methane leak will pressurize the jacket section 24 with methane gas and will then escape through the respective relief valve 36 at the relief pressure of the latter. If the valve 36 is set to relieve pressure at 15 p.s.i.g. and if liquid methane is present in the jacket section 24, boiling of the methane therein can lower the temperature to a value as low as $-240°$ F. This is much lower than the usual temperature of the liquid methane in the inner pipe 16, assumed in this embodiment to be $-130°$ F., so that a temperature reading on the respective recorder 54 of a temperature below $-130°$ F. positively identifies a methane leak.

In the event of a relatively small methane leak the vacuum pump 28 may exhaust most of the methane vapor as soon as it escapes from the inner pipe 16. While some boiling of escaped methane will occur in the jacket section 24 under this condition, the small rate of boiling and small heat absorption capacity will not be sufficient to lower the temperature of the outer pipe 14 to below that of the liquid methane in the inner pipe 16. Therefore the measured temperature drop may not be sufficiently rapid or sufficiently large to indicate to the operator whether the leak is in the inner pipe 16 or in the outer pipe 14. In this event the pressure within the jacket section 24, as indicated by the respective pressure gauge 32 may identify the nature of the leak. For example, if the pressure is slightly above atmospheric pressure, the leak would be a relatively small methane leak of such magnitude that the relief valve 36 has not been actuated. Even if the pressure is below atmospheric, this fact together with the magnitude of the temperature drop may, after an operator has gained experience with the particular system concerned, identify the nature of the leak. For very small leaks it may be necessary to tap the leaking jacket section 24 and analyze a sample of the gas therein for methane or air.

FIGURE 3 shows a modification of the manner of measuring the wall temperature of an outer pipe surrounding an inner pipe 16′. In this arrangement a thermocouple element 40′ is attached to the outer pipe 14′ in the same manner as already described and a second thermocouple 60 is disposed below ground level 12′ near the pipe 14′. The leads from both thermocouples are connected to a potentiometer device 62 which measures the difference between the two signals and amplifies the same for transmittal to a recorder 54′ through leads 48′ and 50′. This arrangement employs the difference in temperature between the ground and the wall of the outer pipe 14′ rather than the temperature of the outer pipe alone and may be advantageous where the ground is subject to temperature changes. For example, if the ground temperature should drop the temperature of the outer pipe 14′ would drop. With this circuit, however, little or no signal would be sent to the recorder 54′, whereas the system shown in FIGURE 1, a signal would be recorded.

Thus, it will be appreciated that the present invention accomplishes the aforesaid objects in an effective and efficient manner. The principles of the invention are applicable to vacuum jacket constructions generally and it is therefore intended that the details of the embodiments described herein be considered as illustrative and not as limiting except as they appear in the appended claims.

What is claimed is:

1. A method for detecting a leak of fluid material into a thermal insulating jacket defined by spaced walls which define between them an evacuated space, the surface of the walls opposite the evacuated space being in contact with fluid at different temperatures, said method comprising measuring the temperature of one of said walls when said space is known to be evacuated and subsequently remeasuring the temperature of said one wall, a difference in temperature at the time of said remeasuring indicating that fluid has entered said space and provided a heat transfer path between said walls.

2. A method as in claim 1 wherein one of said surfaces opposite said space is exposed to the atmosphere whereby said insulating jacket maintains the fluid exposed to the other opposite surface at a substantially constant temperature and wherein said temperature measurements are made on the wall exposed to the atmosphere.

3. A method for detecting a leak of fluid into an annular, evacuated, thermal insulating jacket surrounding a mass of fluid at a temperature different from the temperature of atmospheric air, said jacket having an inner wall contacting said fluid and an outer wall exposed to atmospheric air, said method comprising measuring the temperature of said outer wall when said jacket is known to be evacuated and subsequently remeasuring the temperature of said wall, a difference in temperature at the time of said remeasuring indicating that a leak in one of said walls has occurred and provided a heat transfer path between said walls.

4. A method as in claim 3 wherein said inner wall is exposed to a cold pressurized liquified gas whereby leakage thereof into said evacuated jacket rapidly cools said outer wall to a low temperature and whereby leakage of atmospheric air into said jacket results in a less rapid, less severe cooling of said outer wall, said temperature remeasuring thereby distinguishing an air leak from a leak of said cold liquified gas.

5. A method as in claim 3 wherein said jacket is divided into mutually sealed sections and wherein said said temperature measuring and remeasuring steps are carried out on each section.

6. A method as in claim 3 including the steps of measuring and remeasuring the temperature of the surroundings of said outer wall to thereby determine whether a change in outer wall temperature is caused by a change in the temperature of said surroundings.

7. A vacuum jacketed vessel and leak detection apparatus therefor comprising: an inner wall for enclosing a mass of fluid; an outer wall spaced from and enclosing said inner wall and defining therewith an evacuated, thermal insulating space; and means for indicating leakage of fluid through either of said walls into said space, said means including temperature sensitive means associated with said outer wall for measuring the temperature thereof.

8. Apparatus as in claim 7 further comprising pressure gauge means associated with said space for measuring the pressure therein and further comprising means for releasing a predetermined excess pressure from said space through said outer wall.

9. Apparatus as in claim 7 further comprising sealing means dividing said space into a plurality of end-to-end abutting sections and wherein a temperature sensitive means is associated with the outer wall of each section.

References Cited by the Examiner

UNITED STATES PATENTS

| 2,248,614 | 7/1941 | Ferrant | 73—399 X |
| 2,703,978 | 3/1955 | Baxter | 73—49.1 X |
| 3,214,963 | 11/1965 | Schlumberger et al. | 73—40.7 X |

FOREIGN PATENTS 389,535   3/1933   Great Britain.

LOUIS R. PRINCE, *Primary Examiner.*

D. M. YASICH, *Assistant Examiner.*